(12) United States Patent
Devore et al.

(10) Patent No.: US 6,476,283 B1
(45) Date of Patent: Nov. 5, 2002

(54) HYDROGENATION OF UNSATURATED POLYMERS USING DIVALENT DIENE-CONTAINING BIS-CYCLOPENTADIENYL GROUP IV METAL CATALYSTS

(75) Inventors: David D. Devore, Midland; James C. Stevens, Richmond; Stephen F. Hahn, Midland; Francis J. Timmers, Midland; David R. Wilson, Midland, all of MI (US)

(73) Assignee: The Dow Chemical Company, Midland, MI (US)

( * ) Notice: Subject to any disclaimer, the term of this patent is extended or adjusted under 35 U.S.C. 154(b) by 110 days.

(21) Appl. No.: 09/606,630

(22) Filed: Jun. 29, 2000

Related U.S. Application Data

(60) Provisional application No. 60/143,244, filed on Jul. 9, 1999.

(51) Int. Cl.$^7$ ................ C07C 5/02; C08F 8/00
(52) U.S. Cl. .............. 585/250; 585/255; 585/258; 585/275; 525/338
(58) Field of Search .............. 585/250, 255, 585/258, 275; 525/338

(56) References Cited

U.S. PATENT DOCUMENTS

| | | | | | |
|---|---|---|---|---|---|
| 5,141,997 | A | * | 8/1992 | Chamberlain et al. ... | 525/332.8 |
| 5,321,175 | A | * | 6/1994 | Antonio Barrio Calle et al. ........... | 526/943 |
| 5,753,778 | A | * | 5/1998 | Ko et al. ............. | 525/332.8 |
| 5,789,638 | A | * | 8/1998 | Hahn et al. ........... | 585/275 |
| 6,180,553 | B1 | * | 1/2001 | Masi et al. ........... | 502/114 |
| 6,291,596 | B1 | * | 9/2001 | Sasanuma et al. ...... | 525/332.8 |

* cited by examiner

*Primary Examiner*—Walter D. Griffin
(74) *Attorney, Agent, or Firm*—Carol Cavender; Lynn Zettler

(57) ABSTRACT

Organic compounds are hydrogenated in the presence of certain bis(pentadienyl) divalent Group IV metal complexes having π-bound, neutral, conjugated diene ligands. These complexes are effective hydrogenation catalysts for polymers containing ethylenic unsaturation. They further provide for selective hydrogenation of ethylenic unsaturation sites in the presence of aromatic groups.

35 Claims, No Drawings

HYDROGENATION OF UNSATURATED POLYMERS USING DIVALENT DIENE-CONTAINING BIS-CYCLOPENTADIENYL GROUP IV METAL CATALYSTS

CROSS REFERENCE TO RELATED APPLICATION

This application claims the benefit of U.S. Provisional Application No. 60/143,244, filed on Jul. 9, 1999.

BACKGROUND OF THE INVENTION

This invention relates to a process for hydrogenating olefinically unsaturated polymers.

Various types of organic polymers contain olefinic unsaturation, that is, unsaturation of the type —R'C=CR'— or —R'C=CR'$_2$, wherein R' is hydrogen or an organic radical. The most notable of these are polymers of conjugated dienes, such as poly(butadiene), which contain olefinic unsaturation sites either in the polymer chain itself or pendant thereto. For various reasons, it is sometimes desired to eliminate this unsaturation. The olefinic unsaturation is subject to attack by oxidants, heat, radiation or a combination thereof. This causes the polymer to perform poorly in applications where it is exposed to such conditions.

Thus, various methods of removing this unsaturation through hydrogenation have been devised. These methods generally involve reacting the polymer with a hydrogenating agent, such as hydrogen, in the presence of a metal catalyst.

One such method involves the use of a carrier-supported heterogeneous catalyst in which a metal, such as nickel, platinum or palladium, is supported on a carrier, such as carbon, silica or alumina. Heterogeneous catalysts are often lower in activity than homogeneous catalysts and also often require higher temperature and pressure conditions in order to achieve acceptable reaction rates. The higher temperatures increase energy consumption, thus cost, and can cause the polymer to decompose or the reaction system to gel. Furthermore, a larger amount of heterogeneous catalyst is usually needed on a weight basis, particularly when a high molecular weight polymer is hydrogenated. Also, heterogeneous catalysts are often not selective and can sometimes catalyze hydrogenation of other portions of the polymer, particularly aromatic rings, which may be undesirable for some applications.

Because of the problems with heterogeneous catalysts, homogeneous catalysts have been developed. Homogeneous cobalt and nickel catalysts have been used. U.S. Pat. Nos. 4,668,773; 4,716,257 and 4,801,666 disclose the use of certain lanthanide catalysts in hydrogenation reactions. In addition, certain titanium complexes have also been tried. U.S. Pat. No. 3,920,745, for example, describes the use of certain dicyclopentadienyl carbonyl acetylene titanium compounds in hydrogenating olefins and diolefins. U.S. Pat. No. 5,017,660 describes the hydrogenation of butadiene and styrene-butadiene polymers using di-p-tolylbis-(cyclopentadienyl)titanium (IV) as the catalyst. In U.S. Pat. No. 4,501,857 and U.S. Pat. No. 4,980,421 certain bis(cyclopentadienyl) titanium compounds were used with lithium components in hydrogenation. In U.S. Pat. No. 4,673,714 certain bis(cyclopentadienyl) titanium compounds were found not to require lithium compounds as cocatalysts. Similarly, U.S. Pat. No. 5,206,307 describes the use of various bis(cyclopentadienyl)titanium (IV) compounds to hydrogenate unsaturated polymers in the presence of an alkyl benzoate promoter. U.S. Pat. No. 5,789,638 discloses the use of certain monocyflopentadienyl titanium and zirconium compounds in hydrogenation of copolymers of conjugated dienes.

Despite the development of homogeneous catalysts, several problems remain. Many of the catalysts are colored and must be removed from the product polymer. Others are toxic or present environmental problems. Still others do not selectively hydrogenate olefinic unsaturation, or are not sufficiently active to be used economically.

Thus, it is desirable to have a catalyst which provides reasonably facile hydrogenation under mild or moderate conditions, leaves colorless residues and which avoids known environmental or disposal problems. It is further desirable that the catalyst provides for selective hydrogenation. This is particularly the case where the polymer being hydrogenated contains, in addition to the olefinic unsaturation, other sites that are also subject to hydrogenation or reduction. A prominent example of such a polymer is a copolymer of a diene, such as butadiene, and a vinyl aromatic, such as styrene. Often it is desired to remove the residual unsaturation that is inherent in diene polymers without hydrogenating the rings of the vinyl aromatic monomers. In such instances, the catalyst desirably is highly selective for the olefinic unsaturation, yet provides for facile reaction.

Further, it would be desirable to hydrogenate a polymer, copolymer or mixture thereof having olefinic unsaturation while minimizing cleavage or degradation of the polymer backbone, thus retaining polymer molecular weight through the hydrogenation process.

SUMMARY OF THE INVENTION

This invention is a process for selectively hydrogenating at least one polymer or copolymer or mixture thereof containing olefinic unsaturation. The process comprises reacting or contacting the polymer, copolymer or mixture thereof with a hydrogenating agent in the presence of a catalytic amount of a divalent Group IV metal compound, which is represented by the structure:

CpCp'M·D  Formula 1 wherein M is titanium, zirconium or hafnium, Cp and Cp' are each substituted or unsubstituted cyclopentadienyl ligands, which are optionally the same or different from each other and optionally Cp and Cp' include substituents which form a bridging group connecting Cp and Cp', and D represents a conjugated, neutral diene, which is coordinated via π complexation to the M atom.

According to this method, a facile hydrogenation of the olefinic unsaturation of a polymer is achieved under mild to moderate conditions. Moreover, the hydrogenation is selective, with aromatic groups being minimally affected in the process. Thus, the process is particularly suited for hydrogenating a copolymer of at least one conjugated diene and at least one vinyl aromatic monomer. Advantageously cleavage and degradation of the polymer backbone is minimized relative to cleavage or degradation observed using other hydrogenation catalysts as demonstrated by retention of polymer molecular weight through the hydrogenation process.

DETAILED DESCRIPTION OF THE INVENTION

In this invention, a polymer, copolymer or mixture thereof containing olefinic unsaturation is hydrogenated in the presence of a divalent titanium, zirconium or hafnium compound, which is represented by the structure:

$$CpCp'M \cdot D \qquad \text{Formula 1}$$

wherein M is titanium, zirconium or hafnium, Cp and Cp' are each substituted or unsubstituted cyclopentadienyl ligands, which are optionally the same or different from each other and optionally Cp and Cp' include substituents which form a bridging group connecting Cp and Cp', and D represents a conjugated, neutral diene, which is coordinated via π-complexation to the M atom.

The Cp and Cp' groups are each cyclopentadienyl ligands having the general structures: $C_5R_5$ and $C_5R'_5$, respectively, wherein the R and R' groups are independently hydrogen, hydrocarbyl, silyl, siloxy, germyl, amino, hydrocarbyloxy, dihydrocarbylboryl, cyano or halogen. When R or R' is hydrocarbyl, silyl or germyl, it optionally contains inert substituents, in the sense that the substituents do not undesirably interfere with or react during the hydrogenation reaction. The R groups are optionally the same or different from each other, as are optionally the R' groups. Similarly, the R' groups are optionally the same as or different than the R' groups. Either adjacent R groups, or adjacent R' groups or both optionally together constitute a divalent substituent which form a cyclic structure with the carbon atoms on the cyclopentadienyl group to which they are attached.

Furthermore, one or more R groups and one or more R' groups optionally together form a divalent radical which links the Cp and Cp' groups together. In that instance, the R and R' groups preferably form a linking diradical having the structure $-(ER''_2)_x-$ wherein each E is independently a carbon, silicon or germanium atom, R'' is independently in each occurrence hydrogen, silyl, hydrocarbyl, hydrocarbyloxy, dihydrocarbylamino, siloxy, or two R'' groups together form a ring system including the E atom or atoms to which they are attached. R'' optionally has up to 30 carbon, silicon, nitrogen or oxygen atoms. R'' is preferably hydrogen, methyl, ethyl, methoxy, benzyl, tert-butyl or phenyl. "x" is a number from 1 to about 8.

Alternatively, the R and R' groups optionally preferably form a linking diradical having the structure $-(E'R'')_x-$ wherein each E' is independently a boron or aluminum atom and R'' and x have the meanings above. Preferably E' is boron and R'' is hydrocarbylamino, more preferably dimethylamino or diisopropylamino. Preferably, the R and R' groups, which are not part of the linking diradical, are selected from the group consisting of hydrogen, methyl, ethyl, the various propyl, butyl, pentyl and hexyl isomers, cyclopentyl, cyclohexyl, norbornyl, phenyl, benzyl, trimethyl silyl, methoxy, ethoxy, trimethylsiloxy, dimethylamino, pyrrolidino, piperidino and dimethylboryl. Also preferred are Cp and Cp' groups wherein adjacent R or R' groups are linked together to form a ring fused to the cyclopentadiene ring, as, for example, indenyl, 2-methyl-4-phenylindenyl, 2-methyl-4-(ortho-methyl-phenyl)indenyl, 2-methyl-4-(3,5-dimethyl-phenyl)indenyl, 2-methyl-4-naphthylindenyl, tetrahydroindenyl, fluorenyl, tetrahydrofluorenyl, or octahydrofluorenyl groups. R and R' groups which together form a divalent radical linking the Cp and Cp' groups, such as methylene, 1,2-ethanediyl, 2,2-propanediyl and dimethylsilanediyl linking groups, are also preferred.

Especially preferred cyclopentadienyl groups include cyclopentadienyl, methylcyclopentadienyl, trimethylsilylcyclopentadienyl, t-butylcyclopentadienyl, tetramethylcyclopentadienyl, pentamethylcyclopentadienyl, indenyl, 2-methyl-4-phenylindenyl, 2-methyl-4-(ortho-methyl-phenyl)indenyl, fluorenyl, dimethylaminoindenyl and pyrrolidinoindenyl groups.

M is preferably titanium or zirconium.

The D group is a conjugated, neutral diene which is coordinated via π-complexation through the diene double bonds, and not through σ-bonds which form a metallocycle (σ-bound diene). It preferably contains from about 5 to 30 atoms not including hydrogen. Advantageously, the diene is substituted in either or both of the 1 and 4 positions (the 1 and 4 positions indicating the terminal carbons on the conjugated diene group). Preferably, the diene is 1- or 1,4-substituted to form more stable π-complexes rather than σ-bonds. By the term "π-complex", it is meant that both the donation and back acceptance of electron density by the diene ligand are accomplished using ligand π-orbitals (π-bound diene).

A convenient method of determining the existence of a π- or σ-complex in conjugated diene-containing metal complexes is by measuring metal-carbon atomic spacings for the four carbons which constitute the conjugated diene group, using common X-ray crystal analysis techniques. Measurements of atomic spacings between the metal and C1, C2, C3, and C4 (M-C1, M-C2, M-C3, M-C4, respectively) (where C1 and C4 are the terminal carbons of the 4 carbon conjugated diene group and C2 and C3 are the internal carbons of the 4 carbon conjugated diene group) are made. If the difference between these bond distances, Δd, using the following formula:

$$\Delta d = \left[ \left\{ \frac{(M-C1)+(M-C4)}{2} \right\} - \left\{ \frac{(M-C2)+(M-C3)}{2} \right\} \right]$$

is greater than −0.15 Å, the diene is considered to form a π-complex with M. In the use of such X-ray crystal analysis techniques, at least "good" and preferably "excellent" determination of quality as defined by G. Stout, et al., *X-ray Structure Determination, A Practical Guide*, Macmillan Co., pp. 430–431, (1968), is used.

Examples of calculations according to the foregoing method may be found in Erker, et al., *Angew. Chem. Int. Ed. Eng.*, 23, 455–456 (1984) (Erker et al.) and Yamamoto, et al. *Organometallics*, 8, 105 (1989).

Another method of distinguishing a π-complex from a σ-bound diene is by using nuclear magnetic resonance spectroscopy techniques, as described in Erker, et al., supra, C. Krüger, et al. *Organometallic*, 4, 215–223, (1985), and Yasuda et al., *Organometallics*, 1, 388 (1982). The teachings of the foregoing references relating to distinguishing π-bound from σ-bound complexes are hereby incorporated by reference herein.

Preferred D groups include, for example, $\eta^4$-1-4-diphenyl-1,3-butadiene; $\eta^4$-2,4-hexadiene; $^4$-3-methyl-1,3-pentadiene; $\eta^4$-1,3-pentadiene; $\eta^4$-1,4-bis (tri-methylsilyl) -1,3-butadiene; $\eta^4$-1-phenyl-1,3-pentadiene; $\eta^4$-1,4-tolyl-1,3-butadiene; and $\eta^4$-1,4-dibenzyl-1,3-butadiene. Any of the ligands are optionally bound to the Group IV metal in the cis or trans form.

It is understood that when titanium or zirconium complexes are prepared, a mixture of the π-complexed and σ-complexed diene compounds is often obtained. It is within the scope of this invention to employ a titanium, hafnium or zirconium complex as described in combination with the corresponding σ-complex as an impurity. Alternatively, the σ-complex is optionally separated out using Techniques such as disclosed in Yasuda and Erker. It is also understood that, in the present invention, the bridged metal complexes are optionally employed as mixtures of the racemic and meso isomers or alternatively the meso isomer is optionally separated using standard recrystallization techniques. A preferred method for preparing the racemic isomers is to synthesize this isomer in high or complete isomeric purity using Zr(II) diene compleXes such as $Zr(PR_3)_2Cl_2(-\eta^4-1-4-$diphenyl-1,3-butadiene) as template reagents for the stereoselective complexation of the bridged bis-indenyl or bis-cyclopentadienyl reagents.

Examples of the above metal complexes, wherein the metal is zirconium include: bis($\eta^5$-cyclopenta-dienyl) zirconium s-trans ($\eta^4$-1,4-trans, trans-diphenyl-1,3-butadiene), bis(-$\eta^5$-cyclopentadienyl)zirconium $\eta^4$-1,4-ditolyl-1,3-butadiene, bis($\eta^5$-cyclopentadienyl)zirconium (4-1-4-benzyl-1,3-butadiene, bis ($\eta^5$-cyclopentadienyl) zirconium $\eta^4$-2,4-hexadiene, bis($\eta^5$-cyclopentadienyl) zirconium $\eta^4$-3-methyl-1,3-pentadiene, bis(pentamethyl-$\eta^5$-cyclopentadienyl)zirconium $\eta^4$-1-phenyl-1,3-pentadiene, bis(pentamethyl-$\eta^5$-cyclopentadienyl)zirconium $\eta^4$-1,4-diphenyl-1,3-butadiene, bis(pentamethyl-$\eta^5$-cyclopentadienyl)zirconium $\eta^4$-1,4-dibenzyl-1,3-butadiene, bis(pentamethyl-$\eta^5$-cyclopentadienyl)zirconium $\eta^{4-2,4}$-hexadiene, bis(pentamethyl-$\eta^5$-cyclopentadienyl)zirconium $\eta^4$-3-methyl-1,3-pentadiene, bis(ethyltetramethyl-$\eta^5$-cyclopentadienyl)zirconium $\eta^4$-1,4-diphenyl-1,3-butadiene, bis(ethyltetramethyl-$\eta^5$-cyclopentadienyl)zirconium $\eta^4$-1, 4-dibenzyl-1,3-butadiene, bis(ethyltetramethyl-$\eta^5$-cyclopentadienyl)zirconium $\eta^4$-2,4hexadiene, bis (ethyltetramethyl-$\eta^5$-cyclopentadienyl)zirconium $\eta^4$-3-methyl-1,3-pentadiene, (pentamethyl-$\eta^5$-cyclopentadienyl) ($\eta^5$-cyclopentadienyl)zirconium $\eta^4$-1,4-dibenzyl-1,3-butadiene, (pentamethyl-$\eta^5$-cyclopentadienyl)($\eta^5$-cyclopentadienyl)zirconium $\eta^4$-2,4-hexadiene, bis(t-butyl-$\eta^5$-cyclopentadienyl)-1,2-zirconium $\eta^4$-1,4-diphenyl-1,3-butadiene, bis(t-butyl-$\eta^5$-cyclopentadienyl)zirconium $\eta^4$-1, 4-dibenzyl-1,3-butadiene, bis(t-butyltetramethyl-$\eta^5$-cyclopentadienyl)zirconium $\eta^4$-2,4-hexadiene, $\eta^5$-cyclopentadienyl (tetramethyl-$\eta^5$-cyclopentadienyl) zirconium $\eta^4$-3-methyl 1,3-pentadiene, bis(tetramethyl-$\eta^5$-cyclopentadienyl)zirconium $\eta^4$-1,4-diphenyl-1,3-butadiene, bis(tetramethyl-$\eta^5$-cyclopentadienyl)zirconium $\eta^4$-1-phenyl-1,3-pentadiene, bis-(tetramethyl-$\eta^5$-cyclopentadienyl)zirconium $\eta^4$-3-methyl-1,3-pentadiene, bis(methyl-$\eta^5$-cyclopentadienyl)zirconium $\eta^4$-1,4-diphenyl-1,3-butadiene, bis($\eta^5$-methylcyclopentadienyl) zirconium $\eta^4$-1,4-dibenzyl-1,3-butadiene, bis(trimethyl-silyl-$\eta^5$-cyclopentadienyl)zirconium $\eta^4$-2,4-hexadiene, bis (trimethyl-silyl-$\eta^5$-cyclopentadienyl)-zirconium $\eta 1^4$-3-methyl-1,3-pentadiene, bis(phenyl-($\eta^5$-cyclopentadienyl) zirconium $\eta^4$-1,4-diphenyl-1,3-butadiene, bis (tetramethylphenyl-($\eta^5$-cyclopentadienyl)zirconium $\eta^4$-1,4-diphenyl-1,3-butadiene, ($\eta^5$-cyclopentadienyl) (trimethylsilyl-$\eta^5$-cyclopentadienyl)zirconium $\eta^4$-1,4-diphenyl-1,3-butadiene, ($\eta^5$-cyclopentadienyl) (trimethylsilyl-$\eta^5$-cyclopentadienyl)zirconium $\eta^4$-1,4-dibenzyl-1,3-butadiene, (trimethylsilyl-$\eta^5$-cyclopentadienyl)-(pentamethyl-$\eta^5$-cyclopentadienyl) zirconium $\eta^4$-2,4-hexadiene, ($\eta^5$-cyclopentadienyl) ($\eta^5$-indenyl)zirconium(4-1,4-diphenyl-1,3-butadiene, ($\eta^5$-cyclopentadienyl)(,$\eta^5$-indenyl)zirconium $\eta^4$-1,4-dibenzyl-1,3-butadiene, (trimethylsilyl-$\eta^5$-cyclopentadienyl)-(pentamethyl-$\eta^5$-cyclopentadienyl)zirconium $\eta^4$-2,4-hexadiene, bis(benzyl-$\eta^5$-cyclopentadienyl)zirconium $\eta^4$-3-methyl-1,3-pentadiene, bis($\eta^5$-indenyl)-zirconium $\eta^4$-1,4-diphenyl-1,3-butadiene, bis($\eta^5$-indenyl)zirconium $\eta^4$-1,4-dibenzyl-1,3-butadiene, bis($\eta^5$-indenyl)zirconium $\eta^4$-2,4-hexadiene, bis($\eta^5$-indenyl)zirconium $\eta^4$-3-methyl-1,3-pentadiene, bis($\eta^5$-fluorenyl)zirconium $^4$-1,4-diphenyl-1,3-butadiene, (pentamethylcyclopentadienyl)($\eta^5$-fluorenyl) zirconium $\eta^4$-1-phenyl-1,3-pentadiene, bis($\eta$5-fluorenyl) zirconium $\eta^4$-1,4-dibenzyl-1,3-butadiene, bis($\eta^5$-fluorenyl)-zirconium $\eta^4$-2,4-hexadiene, bis($\eta^5$-fluorenyl) zirconium $\eta^4$-3-methyl-1,3-pentadiene, bis(1-dimethylamino-$\eta^5$-indenyl)-zirconium $\eta^4$-1,4-diphenyl-1,3-butadiene, bis(1-methoxy-$\eta^5$-indenyl)-zirconium $\eta^4$-1,4-diphenyl-1,3-butadiene, bis(1-piperidino-$\eta^5$-indenyl) zirconium $\eta^4$-1,4-dibenzyl-1,3-butadiene, bis(1-pyrrolidino-$\eta^5$-indenyl)zirconium $\eta^4$-2,4-hexadiene, bis (dimethylboryl-$\eta^5$-indenyl)zirconium $\eta^4$-3-methyl-1,3-pentadiene, bis(2-dimethylamino(5-indenyl)-zirconium $\eta^4$-1,4-diphenyl-1,3-butadiene, bis(methoxy-$\eta^5$-indenyl)-zirconium $\eta^4$-1,4-diphenyl-1,3-butadiene, bis(1-piperidino-$\eta^5$-cyclopentadienyl)zirconium $\eta^4$-1,4-dibenzyl-1,3-butadiene, bis(2-pyrrolidino-$\eta^5$-indenyl)zirconium $\eta^4$-2,4-hexadiene and bis(9-dimethylboryl-$\eta^5$-fluorenyl)zirconium $\eta^4$-3-methyl-1,3-pentadiene. The corresponding titanium and hafnium compounds are also preferred.

Exemplary bridged cyclopentadienyl complexes include: dimethylsilanediyl-bis((2-methyl-4-phenyl)-1-indenyl) zirconium s-trans ($\eta^4$-1,4-trans-trans-diphenyl-1,3-butadiene), dimethylsilanediyl-bis((2-methyl-4-(1-naphthyl))-1-indenyl)zirconium s-trans ($\eta^4$-1,4-trans-trans-diphenyl-1,3-butadiene), 1,2-ethanediyl-bis(2-methyl-4-(1-phenyl)-1-indenyl)zirconium s-trans ($\eta^4$-1,4-trans-trans-diphenyl-1,3-butadiene), 1,2-ethanediyl-bis(2-methyl-4-(1-naphthyl)-1-indenyl)zirconium s-trans ($\eta^4$-1,4-trans-trans-diphenyl-1,3-butadiene), [1,2-ethanediylbis(1-indenyl)] zirconium s-trans ($\eta^4$-trans,trans-1,4-diphenyl-1,3-butadiene), [1,2-ethanediylbis(1-tetrahydroindenyl)]-zirconium s-trans($\eta^4$-trans,trans-1,4-diphenyl-1,3-butadiene), [1,2-ethanediyl(1-indenyl)(cyclopentadienyl] zirconium s-trans ($\eta^4$-trans,trans-1,4-diphenyl-1,3-butadiene), [1,2-ethanediyl]1-3-dimethylaminoindenyl) (cyclopentadienyl]zirconium s-trans ($\eta^4$-trans,trans-1,4-diphenyl-1,3-butadiene), [1,2-ethanediyl(9fluorenyl)-(cyclopentadienyl)]-zirconium (trans,trans-1,4-diphenyl-1, 3-butadiene), [1,2-ethanediyl(9-fluorenyl) (cyclopentadienyl)]zirconium(trans,trans-1,4-diphenyl-1,3-butadiene), [1,2-ethanediyl-bis(cyclopentadienyl) [zirconium(trans,trans-1,4-diphenyl-1,3-butadiene), [2,2-propanediyl(1-indenyl)(cyclopentadienyl]zirconium s-trans ($\eta^4$-trans,trans-1,4-diphenyl-1,3-butadiene), [2,2-propanediyl(1,3-dimethylaminoindenyl)(cyclopentadienyl] zirconium s-trans($\eta^4$-trans,trans-1,4-diphenyl-1,3-butadiene), [2,2-propanediyl(9-fluorenyl) (cyclopentadienyl)]-zirconium(trans,trans-1,4-diphenyl-1, 3-butadiene), [2,2-propanediyl(9-fluorenyl) (cyclopentadienyl)]-zirconium(trans,trans-1,4-diphenyl-1, 3-butadiene), [2,2-propanediyl-bis(cyclopentadienyl)]-zirconium(trans,trans-1,4-diphenyl-1,3-butadiene), [dimethylsilanediyl(1-indenyl)(cyclopentadienyl]zirconium s-trans ($\eta^4$-trans,trans-1,4-diphenyl-1,3-butadiene), [dimethylsilanediyl(1-3-dimethylaminoindenyl) (cyclopentadienyl]zirconium s-trans($\eta^4$-trans, trans-1,4-diphenyl-1,3-butadiene), [dimethylsilanediyl(9-fluorenyl)-(cyclopentadienyl)]-zirconium(trans,trans-1,4-diphenyl-1, 3-butadiene), [dimethylsilanediyl(9-fluorenyl)-(cyclopentadienyl)]-zirconium(trans,trans-1,4-diphenyl-1, 3-butadiene), [dimethylsilanediyl-bis(cyclopentadienyl)]-zirconium(trans,trans-1,4-diphenyl-1,3-butadiene) and mixtures thereof. The corresponding titanium and hafnium compounds are also examples of useful complexes.

In general, the complexes useful in the present invention can be prepared by combining a diene compound, corresponding to the group D in the resulting complex, with a metal complex of the formula $CpCp'ML_a$, wherein Cp, Cp' and M are as defined before, L is a leaving group, and a is 1 or 2. Leaving groups L include neutral Lewis bases, such as amines, phosphines, alkenes and carbon monoxide, and radicals, such as hydrocarbyl, hydrocarbyloxy, siloxy, amide or halogen. Preferred L groups are timethylamine, trimethylphosphine, triethylphosphine, carbon monoxide, ethylene, propylene, ethyl, benzyl, butyl, phenyl, methoxy, phenoxy, dimethylamido, chloro, bromo and iodo. In the starting metal complex, the valence of M is 2, 3 or 4. The replacement of the leaving group(s) with the diene is optionally carried out at room temperature or at elevated temperature. When the leaving groups L are neutral Lewis bases or hydrocarbyl groups, this replacement is optionally expedited by heating the mixture of the diene and starting complex, such as in refluxing toluene. When the valence of M in the starting complex is greater than 2, the starting complex is optionally contacted with a reducing agent. The contacting with a reducing agent can be done simultaneously with the contacting of the diene with the starting metal complex, or afterward. The contacting of the starting complex with the diene, reducing agent or a combination of diene and reducing agent is optionally carried out in a noninterfering solvent, if desired, and over a temperature range from about −100° C. to about 300° C., preferably from about −78° C. to about 130° C., more preferably from about −10° C. to about 120° C. By noninterfereing solvent is meant a solvent for reactants that does not undesirably interfere with the formation of the metal complex. For instance, some halogenated solvents, under certain reaction conditions, facilitate oxidation of the metal to a higher oxidation state than is desired. Some protic solvents like water, methanol, acetic acid, certain ketones, aldehydes, nitriles and the like are capable under some reaction conditions of reacting to result in oxidized titanium metal. Alternatively, some solvents are capable of complexing the metal preferentially as compared with the diene or desired ligand. Under reaction conditions where interfering reactions are observed to an undesirable extent, the solvents capable of entering into the reactions are preferably avoided.

By the term "reducing agent", as used herein, is meant a metal or compound which, under reducing conditions can cause the transition metal to be reduced from the +4 or +3 formal oxidation state to the +2 formal oxidation state. The same procedure is employed for the preparation of the diene complexes where M is in the +2 formal oxidation state or in the +4 formal oxidation state, the nature of formal oxidation state of M in the complex being formed being primarily determined by the diene employed. Examples of useful metal reducing agents are alkali metals, alkaline earth metals, aluminum, zinc and alloys of alkali metals or alkaline earth metals, such as sodium/mercury amalgam and sodium/potassium alloy. Specific examples of useful reducing agent compounds are sodium naphthalenide, potassium graphite, lithium alkyls, aluminum trialkyls and Grignard reagents. Most preferred reducing agents are the alkali metals or alkaline earth metals, $C_{1-6}$ alkyl lithium, tri $C_{1-6}$ alkyl aluminum and Grignard reagents, especially lithium, n-butyl lithium and triethyl aluminum. The use of a $C_{1-6}$ alkyl lithium or triethylaluminum reducing agent is especially preferred.

Highly preferred diene compounds are 1,3-pentadiene; 1,4-diphenyl-1,3-butadiene; 1-phenyl-1,3-pentadiene; 1,4-dibenzyl-1,3-butadiene; 2,4-hexadiene; 3-methy-1,3-pentadiene; 1,4-ditolyl-1,3-butadiene; and 1,4-bis(trimethylsilyl)-1,3-butadiene. All geometric isomers of the foregoing diene compounds are optionally utilized.

Useful reaction media for the formation of the complexes are aliphatic and aromatic hydrocarbons and halohydrocarbons, ethers, and cyclic ethers. Examples include straight and branched-chain hydrocarbons, such as isobutane, butane, pentane, hexane, heptane, octane, and mixtures thereof; cyclic and alicyclic hydrocarbons, such as cyclohexane, cycloheptane, methylcyclohexane, methylcycloheptane, and mixtures thereof; aromatic and hydrocarbyl-substituted aromatic compounds, such as benzene, toluene, xylene, $C_{1-4}$ dialkyl ethers, $C_{1-4}$ dialkyl ether derivatives of (poly)alkylene glycols, and tetrahydrofuran. Mixtures of solvents from the foregoing list of solvents are also useful.

The recovery procedure involves separation of the resulting byproducts and devolatilization of the reaction medium. Extraction into a secondary solvent is optionally employed, if desired. Alternatively, if the desired product is an insoluble precipitate, filtration or other separation technique is optionally employed.

A process for preparation of those of the catalysts which are metal complexes corresponding to the formula:

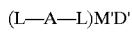 (Formula 2) or a Lewis base adduct thereof, comprises, contacting in any order a Group 4 metal complex corresponding to the formula $M'X_2D'$ or a Lewis base adduct thereof, and a compound of the formula:

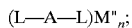

wherein:

M' is titanium, zirconium or hafnium in the +2 formal oxidation state corresponding to a preferred M in Formula 1: CpCp'M•D);

M" is hydrogen or a Group 1 metal cation, a Group 2,metal or zinc dication, a magnesium- or zinc monohalide cation, a tri($C_{1-20}$hydrocarbyl)silyl group, a tri($C_{1-20}$hydrocarbyl)tin group, a mono($C_{1-20}$hydrocarbyl) aluminum group; a di($C_{1-20}$hydrocarbyl)aluminum group; or a mono($C_{1-20}$hydrocarbyl)zinc group, with the proviso that M" is labile under the reaction conditions;

L is an anionic ligand group (each L independently corresponding to one of Cp or Cp' in Formula 1 except that in Formula 1, Cp and Cp' optionally have substituents that correspond to A)) bonded to A, except in the formula (L—A—L)M"$_n$ when M" is hydrogen or silyl, L is a neutral ligand group bonded to A, said L group containing up to 50 atoms other than hydrogen;

A is a divalent bridging group joining two L groups;

D' is a neutral, substituted derivative of 1,3-butadiene, substituted with one or more hydrocarbyl groups, silyl groups, hydrocarbylsilyl groups, silylhydrocarbyl groups, or mixtures thereof, at least one of said substituents being located at the 1- or 4-position, said D' having from 5 up to 40 atoms other than hydrogen (D' corresponding to a preferred D in Formula 1);

X independently each occurrence is a monovalent anionic leaving group of up to 50 atoms other than hydrogen, and optionally, two X groups are joined together thereby forming a divalent anionic leaving group; and n is 1 or 2, and recovering the resulting product. When used to form complexes stereospecifically, this process is referred to herein as using diene complexes as template reagents for the stereoselective complexation of the bridged bis-cyclopentadienyl or bis-indenyl reagents.

When one isomer of a metal complex is more desirable than the other for hydrogenation, advantageously, when the L groups are chosen such that the resulting complexes possess more than one isomer, the foregoing process results in the production of primarily the racemic isomer of the metal complex (L—A—L)M'D', or its Lewis base adduct. Preferably, products containing greater than 60 mole percent, more preferably greater than 70 mole percent of the racemic isomer are formed without use of purification or isomer separation techniques. The process is capable of producing the racemic isomer in essentially pure form and in high yields. This result is believed to be due to the unique chemical properties of the starting reactant.

The Group 4 metal complex corresponding to the formula M'X$_2$D' or a Lewis base adduct thereof, is optionally prepared by a process comprising contacting in any order, in an inert diluent, and optionally in the presence of a Lewis base, a Group 4 metal complex corresponding to the formula, M1X$_4$, or M1X$_4$ (L')$_k$ with a compound corresponding to the formula D"M'"$_{n'}$; wherein, M1 is titanium, zirconium or hafnium in the +4 formal oxidation state;

X independently each occurrence is a monovalent anionic leaving group of up to 50 atoms other than hydrogen, and optionally, two X groups are joined together thereby forming a divalent anionic leaving group;

L' is a Lewis base;

k is a number from 0 to 3;

D" is a divalent derivative of a substituted 1,3-butadiene which is substituted with one or more hydrocarbyl groups, silyl groups, hydrocarbylsilyl groups, silylhydrocarbyl groups, or mixtures thereof, at least one of said substituents being located at the 1- or 4-position, and said D" having from 5 up to 40 atoms other than hydrogen;

M'" is a Group 1 metal cation, a Group 2 metal or zinc dication, a magnesium- or zinc monohalide cation, a mono (C$_{1-20}$ hydrocarbyl) aluminum group; a di (C$_{1-20}$ hydrocarbyl)aluminum group; or a mono(C$_{1-20}$ hydrocarbyl)zinc group; and n' is 1 or 2.

Alternatively, the Group 4 metal complex corresponding to the formula M'X$_2$D' or a Lewis base adduct thereof, is prepared by a process comprising contacting in any order, in an inert diluent, and optionally in the presence of a Lewis base, a Group 4 metal complex corresponding to the formula, M1X$_4$, or M1X$_4$ (L')$_k$ with a reducing agent to prepare a dimeric compound corresponding to the formula:

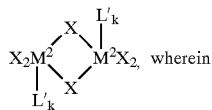 wherein

M' is titanium, zirconium or hafnium in the +2 formal oxidation state;

M1 is titanium, zirconium or hafnium in the +4 formal oxidation state;

M2 is titanium, zirconium or hafnium in the +3 formal oxidation state;

X independently each occurrence is a monovalent anionic leaving group of up to 50 atoms other than hydrogen, and optionally, two X groups (excluding bridging anion X groups) are joined together thereby forming a divalent anionic leaving group L' is a Lewis base, and k is a number from 0 to 3.

Compounds of the formula M'X$_2$D'(L')$_k$ are thereafter formed by subsequently or simultaneously contacting said dimeric compound with the diene D', wherein D' is as previously defined. In the process, the dimeric compound disproportionates thereby forming the diene compound, M'X$_2$D'(L')$_k$, and regenerated starting reagent, M1X$_4$(L')$_k$. If the initial reduction is conducted in the presence of the diene, D', using excess reducing agent, the process will continue through numerous iterations, producing primarily easily separated salt byproducts and the desired diene product, M'X$_2$D'(L')$_k$, resulting in a process that is extremely efficient.

Highly preferably, the reducing agent in the foregoing process is an alkali metal or alkali metal alkyl, most preferably lithium or lithium alkyl, and the inert diluent is a hydrocarbon liquid, most preferably an aliphatic or aromatic hydrocarbon. Using such diluents, excess reducing agent, particularly lithium, will not react with the diene, thereby avoiding a competing and less efficient reaction mechanism to form the desired product.

Optionally, the process is an integrated processes incorporating the foregoing individual processes in varying combination.

All references to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups. Where citation is made herein to any publication, patent application or provisional patent application, the contents thereof are incorporated herein in their entirety by reference.

Preferred metals, M', M1 and M$^2$ are titanium, and zirconium. Preferred M" groups are Li$^+$, K$^+$, Na$^+$, and Grignard cations. Preferred M'" groups are also Li$^+$, K$^+$, Na$^+$, and Grignard cations.

The L moieties are optionally the same or different. Examples of L groups are the Cp and Cp' groups described for Formula 1, except that Cp and Cp' include as substituents A, which is separately defined for Formula 2. Preferred L groups are cyclic (including polycyclic) hydrocarbyl groups or heteroatom containing hydrocarbyl groups, or such groups further substituted with one or more substituents independently selected from the group consisting of hydrocarbyl, silyl, tri(hydrocarbyl)silyl, tri(hydrocarbyl)germyl, halo, cyano, halohydrocarbyl, halocarbyl, N,N-di(hydrocarbyl)amino, hydrocarbyloxy, and tri(hyrocarbyl)siloxy, said substituent having up to 20 atoms other than hydrogen, or optionally, two such substituents are optionally bonded together.

The A grouping is any divalent ligand group able to bond to two L groups. Preferred bridging groups are those corresponding to the formula —(ER"$_2$)$_x$— or —(E'R")$_x$— as defined for Formula 1. A most highly preferred A group is dimethylsilanediyl, dihydrocarbylamido borane or 1,2-ethanediyl.

Examples of D' ligands include: η$^4$-1,4-diphenyl-1,3-butadiene; η$^4$-1,3-pentadiene; η$^4$-1-phenyl-1,3-pentadiene; η$^4$-1,4-dibenzyl-1,3-butadiene; η$^4$-2,4-hexadiene; η$^4$-3-methyl-1,3-pentadiene; η$^4$-1,4-ditolyl-1,3-butadiene; and η$^4$-1,4-bis(trimethylsilyl)-1,3-butadiene. Of the foregoing complexes, terminally di-substituted derivatives (that is, the 1,4-disubstituted 1,3-butadienes are preferred. A most preferred D' ligand is 1,4-diphenyl-1,3-butadiene.

Preferred Group 4 metal reagents include the well known tetrahalide, tetralkoxide, β-diketonate, and tetrakis(N,N-dialkyl)amide salts, their Lewis base adducts, as well as mixed salts containing mixtures of halide, alkoxide, β-diketonate, and amide ligand groups. In addition to the use of the specified Group 4 metal salt the skilled artisan will appreciate that the same result can be obtained by utilizing instead the corresponding salt in the +3 formal oxidation state, and using an oxidizing agent to increase the oxidation state of the metal at the same time, thereby generating the +4 oxidation state metal complex in situ, or reducing the starting +3 salt directly to the +2 oxidation state. Examples of useful oxidizing agents include ferrocenium ion, $Pb^{+2}$, $Ag^{+1}$, and halohydrocarbons, such as methyl chloride, methylene chloride, chloroform, carbon tetrachloride or perchloroethylene.

The metal salts used as reactants of the formula $M'X_2D'$, $M1X_4$ or their corresponding Lewis base adducts are preferably Group 4 metal halide complexes. Highly preferred are compounds containing from 1 to 2, more preferably 2, Lewis base ligands. Preferred Lewis bases are ethers, amines, diamines, triamines, phosphines and thioethers, containing up to 30 atoms other than hydrogen. Especially preferred are trihydrocarbylamines and trihydriocarbylphosphines containing from 1 to 20 carbons in each hydrocarbyl group, most preferably trialkylphosphines, and most highly preferably trimethylphosphine, triethylphosphine, tri-n-propylphosphine, triisopropylphosphine or tri-n-butylphosphine. The Lewis base provides desired stabilization to the metal complex intermediate, e. g., complexes of the formula, $M'X_2D'$.

Inasmuch as the resulting complexes of the formula (L—A—L)M'D' are relatively stable even in the absence of a Lewis base, in the event the Lewis base is utilized to stabilize the intermediate complex, $M'X_2D'$, it is generally highly desirable in order not to affect the catalytic properties of the resulting metal complexes, to subsequently remove the Lewis base from the product, suitably by devolatilization or solubility difference, especially filtration or recrystallization. The Lewis base is optionally recovered and recycled thereby reducing the cost of such component in the process.

Preferred intermediate complexes formed correspond to the formula: $M'X_2D'$ $(L')_2$ wherein M' is hafnium or zirconium, X is halide, D' is 1,4-diphenyl-1,3-butadiene, and L' is trimethylphosphine, triethylphosphine, tri-n-propylphosphine, triisopropylphosphine or tri-n-butylp osphine. More preferred intermediate metal complexes are those wherein X is chloride or bromide. Most preferred intermediate complexes are zirconiumdichloride ($\eta^4$-1,4-diphenyl-1,3-butadiene) bis(triethylphosphine), and zirconiumdichloride ($\eta^4$-1,4-diphenyl-1,3-butadiene) bis(tri-n-propylphosphine).

In general, the process involves combining the respective reactants, preferably in a solution, optionally while agitating, heating above ambient temperature (25° C.) or a combination thereof. Recovery and purification of the intermediate products when a multiple step reaction is employed is optional and sometimes desirable, but is not required. The process preferably is conducted in an inert, noninterfering solvent at a temperature from −100° C. to 300° C., preferably from −78 to 130° C., most preferably from −40 to 120° C.

Useful inert, noninterfering solvents for the formation of the complexes are aliphatic and aromatic hydrocarbons and halohydrocarbons, ethers, and cyclic ethers. Examples include straight and branched-chain ydrocarbons such as isobutane, butane, pentane, hexane, heptane, octane, and mixtures thereof; cyclic and alicyclic hydrocarbons such as cyclohexane, cycloheptane, methy cyclohexane, methylcycloheptane, and mixtures thereof; aromatic and hydrocarbyl-substituted aromatic compou nds such as benzene, toluene, xylene, $C_{1-4}$ dialkyl ethers, $C_{1-4}$ dialkyl ether derivatives of (poly)alkylene glycols, and tetrahydrofuran. Mixtures of solvents from the foregoing list are also useful.

The recovery procedure involves separation of the resulting byproducts and devolatilization of the reaction medium. Extraction into a secondary solvent is optionally employed if desired. Alternatively, if the desired product is an insoluble precipitate, filtration or other separation technique is optionally employed.

The catalyst often contains as a byproduct a small quantity of the coupled diene, especially when starting from a trivalent or tetravalent metal starting material. However, the presence of this coupled diene doesnt interfere substantially with the activity of the catalyst, and it is not necessary to remove it.

If desired, the catalyst is optionally treated with an alkyl metal complex prior to the commencement of the hydrogenation reaction. Useful alkyl metal complexes include those represented by the structures R'''—Na, R'''Li, $R'''_2Mg$, $R'''_3Al$, R'''MgW, wherein W is a halogen and R''' is an alkyl group having from one to ten, preferably 1-4 carbon atoms. The catalyst is advantageously treated with the alkyl metal complex at room temperature for a short period. This is optionally done in the presence of the polymer, copolymer or mixture to be hydrogenated or prior to contacting with the polymer, copolymer or mixture to be hydrogenated. The hydrogenating agent is introduced into the system prior to, during or after this step.

The polymer, copolymer, or mixture thereof to be hydrog enated in this process is characterized by having olefinic unsaturation either within the polymer chain, pendant to it, or both. Of particular interest are polymers or copolymers of one or more conjugated dienes, such a p butadiene, isoprene, 2,3dimethylbutadiene, 2,4-hexadiene, 1,3-pentadiene, 2-methylpentadiene and 1,3-hexadiene, or copolymers of one or more of the foregoing with one or more vinyl aromatic monomers. Among these polymers, copolymers of butadiene and isoprene, and especially polymers of butadiene, are preferred on the basis of cost, availability, and beneficial properties.

The nature of the copolymerized vinyl aromatic monomer is generally not important, provided that any functional group which is optionally present is not substantially undesirably affected by and does not interf re substantially with the hydrogenation reaction. Of part icular interest are copolymers of one or more conjugated dienes and a vinyl aromatic monomer such as styrene, α-methyl styrene, vinyl naphthalene, o-methyl styrene, p-methyl styrene, p-ethyl styrene, divinyl benzene. Of these vinyl aromatic monomers, styrene is most preferred.

The copolymer of the conjugated diene is optionally of any type, such as a random, block, tapered block, semi-block, or graft copolymer. Block copolymers are preferred, particularly AB-type diblock or ABA-type triblock copolymers, wherein A represents a poly(vinyl aromatic) block and B represents a poly(diene) block. In these block copolymers, it is preferred that the poly(diene) portion constitutes about 10 to about 99, more preferably about 25 to about 85 percent of the total weight of the polymer. Most preferred are block copolymers of butadiene and styrene of the AB or ABA type. In an alternative embodiment, the most preferred polymer is a random or substantially random copolymer of butadiene and styrene.

The process of this invention is also applicable to the so-called living polymers or copolymers of conjugated dienes that contain terminal metal atoms. These polymers or copolymers are optionally contacted with hydrogen to remove the terminal metal atoms. This step is optionally done in conjunction with the hydrogenation of this invention. This is optionally achieved by contacting hydrogen, the catalyst and the metal-terminated polymer or ax copolymer in any order, thereby hydrogenating the polymer or copolymer and removing the terminal metal atom during or after the hydrogenation.

The molecular weight of the polymer or copolymer is not critical, and is mainly determined according to the properties required in the particular applications in which the hydrogenated polymer or copolymer will be used. However, since it is preferred to conduct the hydrogenation in the liquid phase, the polymer or copolymer is preferably molten or dissolved in some solvent in which the hydrogenation can be conducted. Thus, a number average molecular weight of from less than 1000 to 5,000,000 or more is useful. If the polymer or copolymer is cross-linked, it is preferably swellable in a solvent in which the hydrogenation can be conducted. The practice of the invention advantageously facilitates hydrogenation while minimizing degradation or cleavage of the polymer backbone; therefore, it is preferred that the number average molecular weight is comparable before and after hydrogenation. Preferably, there is no more than 20, more preferably no more than 10, most preferably no more than 5 percent difference between the number average molecular weights before and after hydrogenation.

Polymers or copolymers to be hydrogenated are optionally prepared by any process within the skill in the art, including anionic polymerization, radical polymerization, Zeigler-Natta polymerization, metallocene polymerization, or cationic polymerization in solution, bulk, mass, emulsion or gas phase processes or combinations thereof.

The hydrogenation is conducted by contacting the polymer or copolymer with a hydrogenating agent in the presence of the catalyst described before. The hydrogenating agent can be any material that provides hydrogen to the reaction, but hydrogen gas is highly preferred because it is readily available, thus inexpensive, and easy to use. Using hydrogen gas as the hy drog nating agent, the reaction is advantageously conduct ed by contacting the polymer or copolymer and catalyst with the hydrogen gas at an elevated pressure. Useful hydrogen partial pressures are at least about 20, preferably 100 psig (138, preferably 689 kPa gauge) and less than or equal to about 5000, preferably 2000, more preferably 400 psig (34,474, preferably 13790, more preferably 2758 kPa gauge).

The hydrogenation reaction is optionally conducted at any temperature at which an adequate reaction rate is achieved. Those skilled in the art are able to recognize adequate reaction rates for specific situations. For instance, a reaction time of greater than 72 hours is seldom commercially advantageous. Less than about 24 hours is usually preferred, with less than 6 hours more preferred. In most instances, an elevated temperature is used, since the reaction normally proceeds slowly at room temperature. On the other hand, the use of the catalyst described herein allows for an acceptable reaction rate at mild to moderate temperatures. Thus, a temperature in the range from about 0° C. to about 200° C. is useful, and a preferred temperature range is from about 25° C. to about 100° C., more preferably from about 40° C. to 75° C.

The amount of catalyst is chosen to provide an acceptable reaction rate. Advantageously, about 1 part by weight catalyst is used per 10 to 50,000, preferably 50 to 50,000 parts per weight of the polymer or copolymer. Higher amounts of catalyst tend to increase the reaction rate. tThe hydrogenating agent is normally used in large stoichiometric excess, particularly if hydrogen is used.

It is preferred to conduct the hydrogenation homogeneously with the polymer or copolymer in a liquid state. Accordingly, unless the polymer or copolymer is a liquid at room temperature or at a slightly elevated tempera ture (up to about 75° C.), it is preferred to conduct the hy rogenation in an inert solvent in which the catalyst is dissolved and the polymer or copolymer is dissolved or swollen. Any solvent which dissolves the polymer or copolymer and which does not engage in any undesirable side reactions with the reagents present in the hydrogenation reaction can be used. Useful solvents include aliphatic hydrocarbons such as n-pentane, n-hexane, n-heptane, n-octane, isooctane,; alicyclic hydrocarbons such as cyclohexane, methylcyclohexane, cycloheptane,; and aromatic solvents such as toluene, xylene, ethylbenzene, diethylbenzene, cumene, and benzene. The solvent is ordinarily used in an amount sufficient to dissolve the polymer or copolymer, and to bring the viscosity of the resulting solution down to a workable range. It has been found that the resulting hydrogenated polymer or copolymer is often less soluble in the solvent than the starting polymer or copolymer. Thus, an amount of solvent sufficient to dissolve the starting polymer or copolymer may not suffice to dissolve the hydrogenated polymer or copolymer product. The precipitation of the insoluble product may facilitate isolation of the product by filtration. Alternatively, in the hydrogenation, the solvent is optionally used in an amount sufficient to dissolve the resulting hydrogenated polymer or copolymer.

The hydrogenating agent, polymer or copolymer and catalyst are contacted under conditions such that thorough contact of the hydrogenating agent with the polymer or copolymer is achieved. When hydrogen is used, this is readily achieved by adding hydrogen gas to a mixture of the polymer or copolymer and the catalyst with sufficient agitation to disperse hydrogen gas bubbles through the polymer or copolymer. Contact times depend somewhat on the degree of hydrogenation desired; however, from a out 15 minutes to about 24 hours, preferably about 1 to about 8 hours is ordinarily sufficient.

Following the hydrogenation reaction, the hydrogenated polymer or copolymer is optionally and preferably recovered from the solvent, if any is used. The hydrogenated polymer or copolymer is optionally caused to precipitate out of the solvent by the addition of a polar solvent, such as acetone or an alcohol, for example, methanol, ethanol or isopropanol. Alternatively, the solvent is optionally distilled off, or hot water or steam is optionally added and a water-solvent azeotrope distilled off. The hydrogenated polymer or copolymer is optionally purified to remove residual catalyst or other impurities, but since the catalyst typically is used in small mounts, purification is optional.

What is claimed is:

1. A process for selectively hydrogenating a polymer, copolymer or mixture thereof containing olefinic unsaturation comprising (a) contacting the polymer, copolymer or mixture with a hydrogenating agent in the presence of a catalytic amount of a divalent Group IV metal compound, which is represented by the structure:

 (Formula 1)

wherein M is titanium, zirconium or hafnium, Cp and Cp' are each substituted or unsubstituted cyclopentadienyl ligands, which are optionally the same or different from each other, and D represents a conjugated, neutral diene, which is coordinated via π complexation to the M atom.

2. The process of claim 1 wherein Cp and Cp' groups are each cyclopentadienyl ligands having the general structures: $C_5R_5$ and $C_5R'_5$, respectively, wherein the R and R' groups are independently hydrogen, hydrocarbyl, silyl, siloxy, germyl, amino, hydrocarbyloxy, dihydrocarbylboryl, cyano or halogen.

3. The process of claim 2 wherein one or more R groups and one or more R' groups form a divalent radical which links the Cp and Cp' groups together.

4. The process of claim 3 wherein the R and R' groups form a linking diradical having the structure —(ER"$_2$)$_x$— wherein each E is independently a carbon, silicon or germanium atom, R" is independently in each occurrence hydrogen, silyl, hydrocarbyl, hydrocarbyloxy, dihydrocarbylamino, siloxy, or two R" groups together form a ring system including the E atom or atoms to which they are attached; and "x" is a number from 1 to 8.

5. The process of claim 3 wherein the R and R' groups optionally form a linking diradical having the structure —(E'R")x— wherein each E is independently a boron or aluminum atom and R" is independently in each occurrence hydrogen, silyl, hydrocarbyl, hydrocarbyloxy, dihydrocarbylamino, siloxy, or two R" groups together form a ring system including the E' atom or atoms to which they are attached; and "x" is a number from 1 to 8.

6. The process of claim 3 wherein the R and R' groups form methylene, 1,2-ethanediyl, 2,2-propanediyl or dimethylsilanediyl linking groups.

7. The process of claim 5 wherein E' is boron and R" is hydrocarbylamino.

8. The process of claim 1 wherein Cp and Cp' groups have adjacent R or R' groups linked together to form a ring fused to the cyclopentadiene ring thus forming a ring system.

9. The process of claim 8 wherein the ring system is selected from indenyl, 2-methyl-4-phenylindenyl, 2-methyl-4-(ortho-methyl-phenyl)indenyl, 2-methyl-4-(3,5-dimethyl-phenyl)indenyl, 2-methyl-4-naphthylindenyl, tetrahydroindenyl, fluorenyl, tetrahydrofluorenyl, or octahydrofluorenyl groups.

10. The process of claim 1 wherein Cp and Cp' are selected from cyclopentadienyl, methylcyclopentadienyl, trimethylsilylcyclopentadienyl, t-butylcyclopentadienyl, tetramethylcyclopentadienyl, pentamethylcyclopentadienyl, indenyl, 2-methyl-4-phenylindenyl, 2-methyl-4-(ortho-methyl-phenyl)indenyl, fluorenyl, dimethylaminoindenyl and pyrrolidinoindenyl groups.

11. The process of claim 1 wherein Cp and Cp' are cyclopentadienyl groups.

12. The process of claim 1 wherein M is titanium or zirconium.

13. The process of claim 1 wherein D is substituted in either or both of the 1 and 4 positions.

14. The process of claim 1 wherein the D group is selected from $\eta^4$-1-4-diphenyl-1,3-butadiene; $\eta^4$-2,4-hexadiene; $\eta^4$-3-methyl-1,3-pentadiene; $\eta^4$-1,3-pentadiene; $\eta^4$-1,4-bis(tri-methylsilyl)-1,3-butadiene; $\eta^4$-1-phenyl-1,3-pentadiene; $\eta^4$-1,4-tolyl-1,3-butadiene; and $\eta^4$-1,4-dibenzyl-1,3-butadiene.

15. The process of claim 1 wherein the metal compound is selected from bis($\eta^5$-cyclopentadienyl)zirconium s-trans ($\eta^4$-1,4-trans, trans-diphenyl,1,3-butadiene), bis(-$\eta^5$-cyclopentadienyl)zirconium $\eta^4$-1,4-ditolyl-1,3-butadiene, bis($\eta^5$-cyclopentadienyl)zirconium(4-1-4-benzyl-1,3-butadiene, bis($\eta^5$-cyclopentadienyl)zirconium $\eta^4$-2,4-hexadiene, bis($\eta^5$-cyclopentadienyl)zirconium $\eta^4$-3-methyl-1,3-pentadiene, bis($\eta^5$-cyclopentadienyl)zirconium $\eta^4$-1-phenyl-1,3-pentadiene, bis(pentamethyl-$\eta^5$-cyclopentadienyl)zirconium $\eta^4$-1,4-diphenyl-1,3-butadiene, bis(pentamethyl-$\eta^5$-cyclopentadienyl)zirconium $\eta^4$-1,4-dibenzyl-1,3-butadiene, bis(pentamethyl-$\eta^5$-cyclopentadienyl)zirconium $\eta^4$-2,4-hexadiene, bis(pentamethyl-$\eta^5$-cyclopentadienyl)zirconium $\eta^4$-3-methyl-1,3-pentadiene, bis(ethyltetramethyl-$\eta^5$-cyclopentadienyl)zirconium $\eta^4$-1,4-diphenyl-1,3-butadiene, bis(ethyltetramethyl-$\eta^5$-cyclopentadienyl)zirconium $\eta^4$-1,4-dibenzyl-1,3-butadiene, bis(ethyltetramethyl-$\eta^5$-cyclopentadienyl)zirconium $\eta^4$-hexadiene, bis(ethyltetramethyl-$\eta^5$-cyclopentadienyl)zirconium $\eta^4$-3-methyl-1,3-pentadiene, (pentamethyl-$\eta^5$-cyclopentadienyl)($\eta^5$-cyclopentadienyl)zirconium $\eta^4$-1,4-dibenzyl-1,3-butadiene, (pentamethyl-$\eta^5$-cyclopentadienyl)($\eta^5$-cyclopentadienyl)zirconium $\eta^4$-2,4-hexadiene, bis(t-butyl-$\eta^5$-cyclopentadienyl)-1,2-zirconium $\eta^4$-1,4-diphenyl-1,3-butadiene, bis(t-butyl-$\eta^5$-cyclopentadienyl)zirconium $\eta^4$-1,4-dibenzyl-1,3-butadiene, bis(t-butyltetramethyl-$\eta^5$-cyclopentadienyl)zirconium $\eta^4$-2,4-hexadiene, $\eta^5$-cyclopentadienyl (tetramethyl-$\eta^5$-cyclopentadienyl) zirconium $\eta^4$-3-methyl 1,3-pentadiene, bis(tetramethyl-$\eta^5$-cyclopentadienyl)zirconium $\eta^4$-1,4-diphenyl-1,3-butadiene, bis(tetra-methyl-$\eta^5$-cyclopentadienyl)zirconium $\eta^4$-1-phenyl-1,3-pentadiene, bis-(tetramethyl-$\eta^5$-cyclopentadienyl)zirconium $\eta^4$-3-methyl-1,3-pentadiene, bis(methyl-$\eta^5$-cyclopentadienyl)zirconium $\eta^4$-1,4-diphenyl-1,3-butadiene, bis($\eta^5$-methylcyclopentadienyl)zirconium $\eta^4$-1,4dibenzyl-1,3-butadiene, bis(trimethylsilyl-$\eta^5$-cyclopentadienyl)zirconium $\eta^4$-2,4-hexadiene, bis(trimethylsilyl-$\eta^5$-cyclopentadienyl)zirconium $\eta^4$-3-methyl-1,3-pentadiene, bis(phenyl-($\eta^5$-cyclopentadienyl) zirconium $\eta^4$-1,4-diphenyl-1,3-butadiene, bis(tetramethylphenyl-($\eta^5$-cyclopentadienyl)zirconium $\eta^4$-1,4-diphenyl-1,3-butadiene, ($\eta^5$-cyclopentadienyl)(trimethylsilyl-$\eta^5$-cyclopentadienyl)zirconium $\eta^4$-1,4-diphenyl-1,3-butadiene, ($\eta^5$-cyclopentadienyl)(trimethylsilyl-$\eta^5$-cyclopentadienyl)zirconium $\eta^4$-1,4-dibenzyl-1,3-butadiene, (trimethylsilyl-$\eta^5$-cyclopentadienyl)(pentamethyl-$\eta^5$-cyclopentadienyl) zirconium $\eta^4$-2,4-hexadiene, ($\eta^5$-cyclopentadienyl)($\eta^5$-indenyl)zirconium(4-1,4-diphenyl-1,3-butadiene, ($\eta^5$-cyclopentadienyl)($\eta^5$-indenyl)zirconium $\eta^4$-1,4-dibenzyl-1,3-butadiene, (trimethylsilyl-$\eta^5$-cyclopentadienyl)-(pentamethyl-$\eta^5$-cyclopentadienyl)zirconium $\eta^4$-2,4-hexadiene, bis(benzyl-$\eta^5$-cyclopentadienyl)zirconium $\eta^4$-3-methyl-1,3-pentadiene, bis($\eta^5$-indenyl)-zirconium $\eta^4$-1,4-diphenyl-1,3-butadiene, bis($\eta^5$-indenyl)zirconium $\eta^4$-1,4-dibenzyl-1,3-butadiene, bis($\eta^5$-indenyl)zirconium $\eta^4$=2,4-hexadiene, bis($\eta^5$-indenyl)zirconium $\eta^4$-3-methyl-1,3-pentadiene, bis($\eta^5$-fluorenyl)zirconium $\eta^4$-1,4-diphenyl-1,3-butadiene, (pentamethylcyclopentadienyl)($\eta^5$-fluorenyl)zirconium $\eta^4$-1-phenyl-1,3-pentadiene, bis($\eta^5$-fluorenyl)zirconium $\eta^4$-1,4-dibenzyl-1,3-butadiene, bis($\eta^5$-fluorenyl)-zirconium $\eta^4$-2,4-hexadiene, bis($\eta^5$-fluorenyl)zirconium $\eta^4$-3-methyl-1,3-pentadiene, bis(1-dimethylamino-$\eta^5$-indenyl)-zirconium $\eta^4$-1,4-diphenyl-1,3-butadiene, bis(1-methoxy-$\eta^5$-indenyl)zirconium $\eta^4$-1,4-diphenyl-1,3-butadiene, bis(1-piperidino-$\eta^5$-indenyl) zirconium $\eta^4$-1,4-dibenzyl-1,3-butadiene, bis(1-pyrrolidino-$\eta^5$-indenyl)zirconium $\eta^4$-2,4-hexadiene, bis(dimethylboryl-$\eta^5$-indenyl)zirconium $\eta^4$-3-methyl-1,3-pentadiene, bis(2-dimethylamino(5-indenyl)-zirconium $\eta^4$-1,4-diphenyl-1,3-butadiene, bis(methoxy-$\eta^5$-indenyl)-zirconium $\eta^4$-1,4-diphenyl-1,3-butadiene, bis(1-piperidino-$\eta^5$-cyclopentadienyl)zirconium $\eta^4$-1,4-dibenzyl-1,3-butadiene, bis(2-pyrrolidino-$\eta^5$-indenyl)zirconium $\eta^4$-2,4-hexadiene and bis(9-dimethylboryl-$\eta^5$-fluorenyl)zirconium η⁴-3-methyl-1,3-pentadiene, dimethylsilanediyl-bis((2-methyl-4-phenyl)-1-indenyl)zirconium s-trans(η⁴-1,4-trans-trans-diphenyl-1,3-butadiene), dimethylsilanediyl-bis((2-methyl-4-(1-naphthyl))-1-indenyl)zirconium s-trans(η⁴-1,4-trans-trans-diphenyl-1,3-butadiene), 1,2-ethanediyl-bis(2-methyl-4-(1-phenyl)-1-indenyl)zirconium, s-trans(η⁴-1,4-trans-trans-diphenyl-1,3-butadiene), 1,2-ethanediyl-bis(2-methyl-4-(1-naphthyl)-1-indenyl)zirconium s-trans(η⁴-1,4-trans-trans-diphenyl-1,3-butadiene), [1,2ethanediylbis(1-indenyl)]zirconium s-trans(η⁴-trans,trans-1,4-diphenyl-1,3-butadiene), [1,2-ethanediylbis(1-tetrahydroindenyl)]-zirconium s-trans(η⁴-trans,trans-1,4-diphenyl-1,3-butadiene), [1,2-ethanediyl(1-indenyl)(cyclopentadienyl] zirconium s-trans(η⁴-trans,trans-1,4-diphenyl-1,3-butadiene), [1,2-ethanediyl)1-3-dimethylaminoindenyl) (cyclopentadienyl]zirconium s-trans(η⁴-trans,trans-1,4-diphenyl-1,3-butadiene), [1,2-ethanediyl(9-fluorenyl)-(cyclopentadienyl)]-zirconium (trans,trans-1,4-diphenyl-1,3-butadiene), [1,2-ethanediyl(9-fluorenyl)-(cyclopentadienyl)]zirconium(trans,trans-1,4-diphenyl-1,3-butadiene), [1,2-ethanediylbis(cyclopentadienyl)[zirconium (trans,trans-1,4-diphenyl-1,3-butadiene), [2,2-propanediyl (1-indenyl)(cyclopentadienyl]zirconium s-trans(η⁴-trans,trans-1,4-diphenyl-1,3-butadiene), [2,2-propanediyl(1,3-dimethylaminoindenyl)(cyclopentadienyl]zirconium s-trans (η⁴-trans,trans-1,4-diphenyl-1,3-butadiene), [2,2-propanediyl(9-fluorenyl)(cyclopentadienyl)]-zirconium (trans,trans-1,4-diphenyl-1,3-butadiene), [2,2-propanediyl (9-fluorenyl)(cyclopentadienyl)]-zirconium(trans,trans-1,4-diphenyl-1,3-butadiene), [2,2-propanediyl-bis (cyclopentadienyl)]-zirconium(trans,trans-1,4-diphenyl-1,3-butadiene), [dimethylsilanediyl(1-indenyl) (cyclopentadienyl]zirconium s-trans(η⁴-trans,trans-1,4-diphenyl-1,3-butadiene), [dimethylsilanediyl(1-3-dimethylaminoindenyl)(cyclopentadienyl]zirconium s-trans (η⁴-trans,trans-1,4-diphenyl-1,3-butadiene), [dimethylsilanediyl(9-fluorenyl)-(cyclopentadienyl)]-zirconium(trans,trans-1,4-diphenyl-1,3-butadiene), [dimethylsilanediyl(9-fluorenyl)-(cyclopentadienyl)]-zirconium(trans,trans-1,4-diphenyl-1,3-butadiene), [dimethylsilanediyl-bis(cyclopentadienyl)]-zirconium (trans,trans-1,4-diphenyl-1,3-butadiene) and mixtures thereof and the corresponding titanium and hafnium compounds.

16. The process of claim 1 wherein the metal compound of Formula 1 is a metal complex corresponding to the formula:

  (Formula 2)

or a Lewis base adduct thereof, wherein the process comprises, contacting in any order a Group 4 metal complex corresponding to the formula M'X₂D' or a Lewis base adduct thereof, and a compound of the formula: (L—A—L)M"ₙ; wherein:

M' is titanium, zirconium or hafnium in the +2 formal oxidation state corresponding to a preferred H in Formula 1: CpCp'M•D};

M" is hydrogen or a Group 1 metal cation, a Group 2 metal or zinc dication, a magnesium- or zinc monohalide cation, a tri($C_{1-20}$hydrocarbyl)silyl group, a tri($C_{1-20}$hydrocarbyl)tin group, a mono($C_{1-20}$hydrocarbyl) aluminum group; a di($C_{1-20}$hydrocarbyl)aluminum group; or a mono($C_{1-20}$hydrocarbyl)zinc group, with the proviso that M" is labile under the reaction conditions;

L is an anionic ligand group (each L corresponding to one of Cp or Cp' in Formula 1 except that in Formula 1, Cp and Cp' optionally have substituents that correspond to A) bonded to A, except in the formula (L—A—L)M"ₙ when M" is hydrogen or silyl, L is a neutral ligand group bonded to A, said L group containing up to 50 atoms other than hydrogen;

A is a divalent bridging group joining two L groups;

D' is a neutral, substituted derivative of 1,3-butadiene, substituted with one or mere hydrocarbyl groups, silyl groups, hydrocarbylsilyl groups, silylhydrocarbyl groups, or mixtures thereof, at least one of said substituents being located at the 1- or 4-position, said D' having from 5 up to 40 atoms other than hydrogen (D' corresponding to a preferred D in Formula 1};

X independently each occurrence is a monovalent anionic leaving group of us to 50 atoms other than hydrogen, and optionally, two X groups are joined together thereby forming a divalent anionic leaving group; and n is 1 or 2.

17. The process of claim 1 wherein the metal compound is treated with an alkyl metal complex prior to the commencement of the hydrogenation reaction.

18. The process of claim 17 wherein the alkyl metal complex is represented by the structures R'''—Na, R'''Li, R'''₂Mg, R'''₃Al, R'''MgW, wherein W is a halogen and R''' is an alkyl group having from one to ten carbon atoms.

19. The process of claim 1 wherein the hydrogenating agent is hydrogen.

20. The process of claim 19 wherein the hydrogen is present at a partial pressure of from about 138 kPa gauge to about 34,474 kPa gauge.

21. The process of claim 1 which takes place at a temperature of from about 0° C. to about 200° C.

22. The process of claim 1 which takes place at a temperature of from about 40° C. to about 200° C.

23. The process of claim 1 which takes place homogeneously with the polymer or copolymer or mixture thereof in a liquid state.

24. The process of claim 23 which takes place in a solvent which dissolves or swells the polymer, copolymer or mixture thereof.

25. The process of claim 1 wherein at least one polymer or copolymer is a polymer or copolymer of at least one conjugated diene.

26. The process of claim 25 wherein at least one polymer or copolymer is a copolymer or polymer of at least one vinyl aromatic monomer.

27. The process of claim 25 wherein the conjugated diene is selected from butadiene, isoprene, 2,3-dimethylbutadiene, 2,4-hexadiene, 1,3-pentadiene, 2-methylpentadiene and 1,3-hexadiene, or a combination thereof.

28. The process of claim 25 wherein at least one polymer or copolymer is a copolymer selected from copolymers of butadiene or isoprene, and a vinyl aromatic monomer selected from styrene, m-methyl styrene, vinyl naphthalene, α-methyl styrene, p-methyl styrene, p-ethyl styrene, and divinylbenzene.

29. The process of claim 26 wherein the copolymer of the conjugated diene is a random, block, tapered block, semi-block, or graft copolymer.

30. The process of claim 29 wherein the copolymer is a block copolymer selected from AB diblock or ABA triblock copolymers, wherein A represents a poly(vinyl aromatic) block and B represents a poly(diene) block.

31. The process of claim 30 wherein the poly(diene) portion constitutes 10 to 99 percent of the total weight of the polymer.

32. The process of claim 30 wherein the copolymer is a random or substantially random copolymer of butadiene and styrene.

33. The process of claim 1 wherein at least one polymer or copolymer has an initial number average molecular weight between 1,000 and 5,000,000 before hydrogenation and has a product number average molecular weight after hydrogenation of less than 10 percent less than its initial number average molecular weight.

34. The process of claim 33 werein the product number average molecular weight is less than 5 percent less than the initial number average molecular weight.

35. The process of claim 1 wherein the hydrogenation is carried out at a temperature from about 25° C. to about 100° C. and a hydrogen partial pressure of from about 689 kPa gauge to about 13,790 kPa gauge and the catalyst concentration is from about 50 to about 50,000 parts by weight per part by weight of polymer, copolymer or mixture thereof in an inert solvent and the contacting takes place for a period of time with-in the range from about 15 minutes to about 8 hours.

* * * * *